(12) United States Patent
Takahashi et al.

(10) Patent No.: US 7,368,891 B2
(45) Date of Patent: May 6, 2008

(54) CHARGE CONTROL METHOD OF CAPACITOR IN THYRISTOR CONVERTER

(75) Inventors: Hajime Takahashi, Kitakyushu (JP); Kazuhiko Hiramatsu, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 37 days.

(21) Appl. No.: 11/341,856

(22) Filed: Jan. 30, 2006

(65) Prior Publication Data
US 2006/0186861 A1    Aug. 24, 2006

Related U.S. Application Data

(63) Continuation-in-part of application No. PCT/JP2004/010406, filed on Jul. 22, 2004.

(30) Foreign Application Priority Data
Jul. 30, 2003    (JP)    ............... 2003-283060

(51) Int. Cl.
*H02J 7/00*    (2006.01)
(52) U.S. Cl. ............... 320/166; 323/210; 323/234; 323/299; 307/105; 318/341
(58) Field of Classification Search ............... 320/166, 320/DIG. 23; 318/341; 323/234, 299
See application file for complete search history.

(56) References Cited

U.S. PATENT DOCUMENTS

| | | | | |
|---|---|---|---|---|
| 3,663,943 A | * | 5/1972 | Nakajima et al. | ............... 363/85 |
| 4,234,842 A | * | 11/1980 | Brennen et al. | ............ 323/210 |
| 4,249,236 A | * | 2/1981 | Omae et al. | ............... 363/87 |
| 4,340,807 A | * | 7/1982 | Raskin et al. | ............... 219/497 |
| 4,362,976 A | * | 12/1982 | Fujioka et al. | ............... 388/819 |
| 4,529,925 A | * | 7/1985 | Tanaka et al. | ............... 323/207 |
| 4,585,982 A | * | 4/1986 | Cooper et al. | ............... 318/723 |
| 4,682,278 A | * | 7/1987 | Marquardt et al. | ............ 363/58 |
| 4,697,126 A | * | 9/1987 | Jarvinen et al. | ............ 388/813 |
| 5,075,608 A | * | 12/1991 | Erdman et al. | ............. 318/599 |
| 5,343,079 A | * | 8/1994 | Mohan et al. | ............... 307/105 |
| 5,347,441 A | * | 9/1994 | Terada et al. | ................. 363/39 |

(Continued)

FOREIGN PATENT DOCUMENTS

JP    4-26372    1/1992

(Continued)

*Primary Examiner*—Bao Q. Vu
*Assistant Examiner*—M'baye Diao
(74) *Attorney, Agent, or Firm*—Westerman, Hattori, Daniels & Adrian, LLP.

(57) ABSTRACT

Charging time of a capacitor is shortened while avoiding erroneous firing due to distortion of a power supply voltage and sustaining an inrush current at a constant level. In the charge control method of a capacitor in a thyristor converter comprising a thyristor for rectifying an AC voltage, a CPU delivering an on/off control signal to a thyristor driver for driving the thyristor, a voltage detection sensor for measuring the AC voltage and the capacitor charging voltage, and the capacitor connected with a DC circuit, the AC voltage and the capacitor charging voltage are measured by means of the voltage detection sensor, differential voltage between the firing phase voltage of the thyristor and the capacitor charging voltage is determined, and the thyristor is fired only when the firing phase voltage of the thyristor becomes lower than a specified voltage determined from the differential voltage.

3 Claims, 6 Drawing Sheets

U.S. PATENT DOCUMENTS 5,892,354 A * 4/1999 Nagao et al. ............... 323/299
6,205,012 B1 * 3/2001 Lear ........................... 361/143
6,643,154 B1 * 11/2003 Hagman ..................... 363/96

FOREIGN PATENT DOCUMENTS

JP  2000-287452  10/2000
JP  2002-247760  8/2002

* cited by examiner

CHARGE CONTROL METHOD OF CAPACITOR IN THYRISTOR CONVERTER

This application is a continuation-in-part of International Application No. PCT/JP2004/10406 filed on Jul. 22, 2004.

FIELD OF THE INVENTION

The present invention relates to a charge control method of a capacitor in a thyristor converter for converting an AC voltage into a DC voltage.

BACKGROUND OF THE INVENTION

The following description sets forth the inventor's knowledge of related art and problems therein and should not be construed as an admission of knowledge in the prior art.

In a conventional converter, it is required to put a resistor in a power supply line to restrict an inrush current due to a rectification by a diode bridge. In such converter, however, steep and high current initially flows when an AC power source is turned on in a state in which a condenser is not charged. In order to restrain such current, it is required to increase the value of resistance to be inserted in the power supply line. However, this causes a longer charging time. In order to avoid these drawbacks, a charge control using a thyristor can be considered. In a conventional method, a firing timing of a thyristor is determined by measuring a cycle of an AC power supply and estimating the phase. In another control method (e.g., Japanese Unexamined Laid-open Patent Publication No. H04-26372), a firing angle of a thyristor is calculated by detecting an AC power supply phase and the thyristor is fired at a certain voltage difference by comparing the AC voltage and the capacitor voltage at the time of firing the thyristor.

As explained above, in a conventional thyristor converter, the capacitor was charged while controlling the firing angle based on the detection of the AC power supply phase and the comparison of the AC voltage and the capacitor voltage.

In a conventional thyristor converter, since the steps of detecting the phase detection using the voltage detection as it is and the voltage difference of the AC voltage and the capacitor voltage and charging a capacitor while controlling the firing angle have been employed, there was such problem that the thyristor was fired at an erroneous timing since no constant voltage difference could be obtained due to a failure of accurate power supply phase detection and voltage detection in cases where the detected power supply voltage had distortion. There also were problems that charging time was dispersed due to the connected power supply impedance and the capacitance of the capacitor and that the charging time increased due to the single phase thyristor firing control.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a charge control method of a capacitor in a thyristor converter capable of shortening a charging time of a capacitor while avoiding erroneous firing due to distortion of a power supply voltage and sustaining an inrush current at a constant level.

According to a first aspect of the present invention, a charge control method of a capacitor in a thyristor converter equipped with a thyristor for rectifying an AC voltage, a CPU for outputting an on/off control signal to a thyristor driver for driving the thyristor, a voltage detection sensor for measuring the AC voltage and a capacitor charging voltage, and a capacitor connected to a DC circuit, characterized in that the AC voltage and the capacitor charging voltage are measured with the voltage detection sensor, and a differential voltage between the thyristor firing phase voltage and the capacitor charging voltage is determined, and the thyristor is fired only when the firing phase voltage of the thyristor becomes lower than a specified voltage determined from the differential voltage.

It is preferable that if a firing start interval of the thyristor is not shorter than a time calculated by subtracting a predetermined time from the previous firing start interval, the thyristor is fired at one control cycle earlier than the previous firing start timing by subtracting 1 from the previous firing start counter value.

According to a second aspect of the present invention, a curve a of a capacitor voltage $V_{PN}$ versus a differential voltage $\Delta V_{REF}$ in which the line voltage waveform is multiplied by the differential voltage $\Delta V_{REQ}$ required to attain a predetermined capacitor voltage and divided by a peak value $V_{PEAK}$ of the line voltage waveform is obtained, wherein a curve b in which the curve a is multiplied by a coefficient in the capacitor direction $V_{PN}$ to compensate a control calculation delay by the CPU is obtained, wherein a curve c in which a voltage $\Delta V_{MIN}$ which is necessary and sufficient to charge the capacitor is added to the curve a is obtained, and wherein a curve d in which the curve b is used at an area where the capacitor charging voltage $V_{PN}$ is low and the curve c is used at an area where the capacitor charging voltage is high is obtained.

It is preferable that a ROM in which the curve d as table data is stored is provided.

According to the first aspect of the present invention, an inrush current can be kept at a constant level at the time of firing each thyristor by setting the difference voltage of the AC power voltage and the capacitor voltage at the time of starting the firing of the thyristor to a voltage determined from a cosine curve.

According to the second aspect of the present invention, in cases where a pattern in which the AC power voltage has distortion and the thyristor is fired at an erroneous timing is calculated, an excess current of an inrush current due to erroneous firing can be prevented by changing the firing time into a firing time shorter than the previous firing time. Thus, it becomes possible to prevent occurrence of a failure of a converter and/or a system using the converter.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 3 shows detected voltage waveforms, line voltage waveforms, a capacitor voltage, and a PN bus line current when the thyristor is turned on;

DETAILED DESCRIPTION OF THE INVENTION

In the following paragraphs, some embodiments of the invention will be described by way of example and not limitation. It should be understood based on this disclosure that various other modifications can be made by those in the art based on these illustrated embodiments.

Hereinafter, referable embodiments of the method according to the present invention will be explained with reference to the attached drawings.

Figure 1:
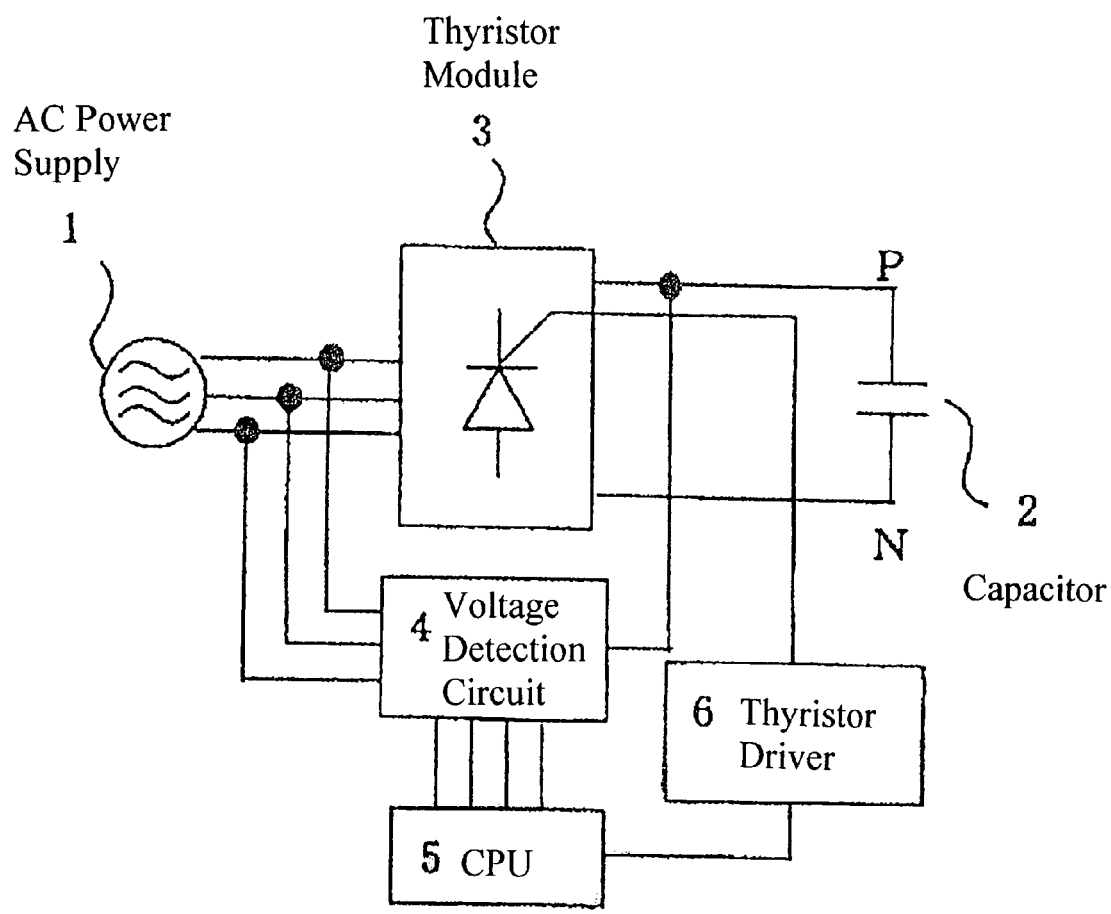
FIG. 1 is a block diagram showing the structure of a thyristor converter to which the present invention is applied.

FIG. 1 shows a block diagram showing the structure of a thyristor converter for executing the method of the present invention. In FIG. 1, the reference numeral "1" denotes an AC power supply, the reference numeral "2" denotes a capacitor, the reference numeral "3" denotes a thyristor module, the reference numeral "4" denotes a voltage detection circuit, and the reference numeral "5" denotes a CPU. The reference letter "P" denotes an output side positive DC bus line of the thyristor module 3, and "N" denotes an output side negative DC bus line of the thyristor module 3.

The thyristor module 3 as a rectifier provides a DC power from a three-phase commercial AC power supply 1 to the capacitor 2. The voltage detection circuit 4 detects both the three-phase AC power voltage and the voltage of the capacitor 2 and then outputs the detected voltage signal to the CPU 5 after the AD conversion. The CPU 5 executes a prescribed calculation based on the detected voltage signal from the voltage detection circuit 4 and outputs a gate pulse signal to the gate of thyristor module 3 via the thyristor driver 6 to control the firings of thyristors.

Figure 2:
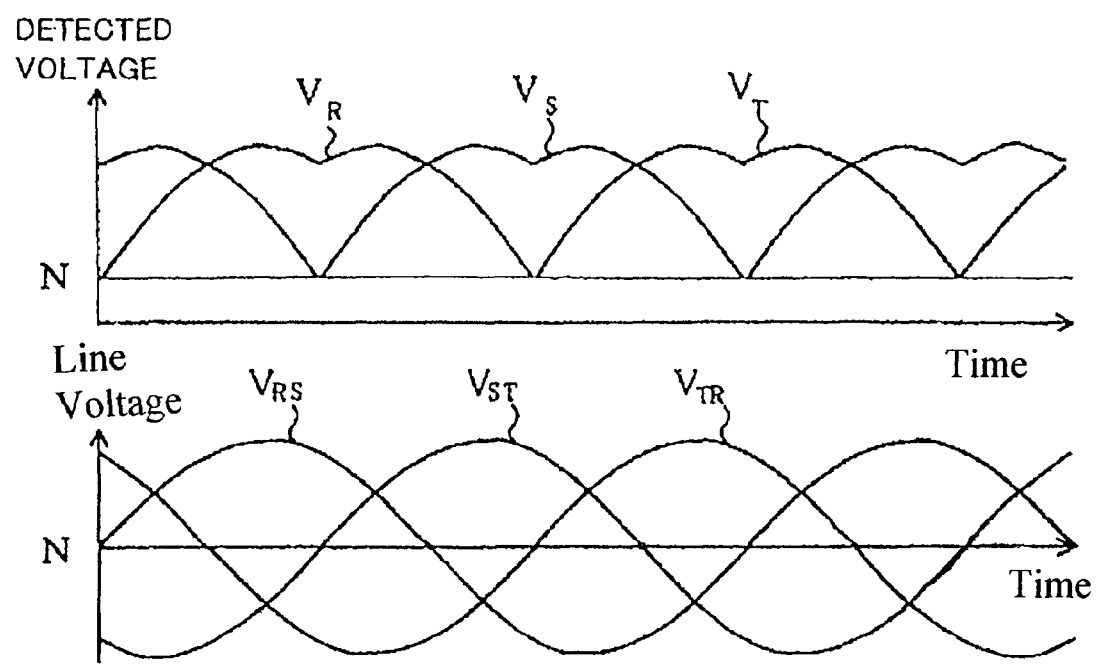
FIG. 2 shows detected voltage waveforms and line voltage waveforms when the thyristor is turned off.

FIG. 2 shows the detected voltage waveforms and the line voltage waveforms of the thyristor converter in a situation in which thyristors are turned off. In this figure, the upper half shows an N side basis detected voltage waveforms $V_R$, $V_S$, $V_T$ of the divided voltage of the commercial AC power source 1 detected by the voltage detection circuit 4 in a case in which the N side thyristors are used as diodes, and the lower half shows the line voltage wave forms $V_{RS}$, $V_{ST}$, $V_{TR}$ calculated by the CPU 5 using $V_R$, $V_S$, $V_T$.

Figure 3:
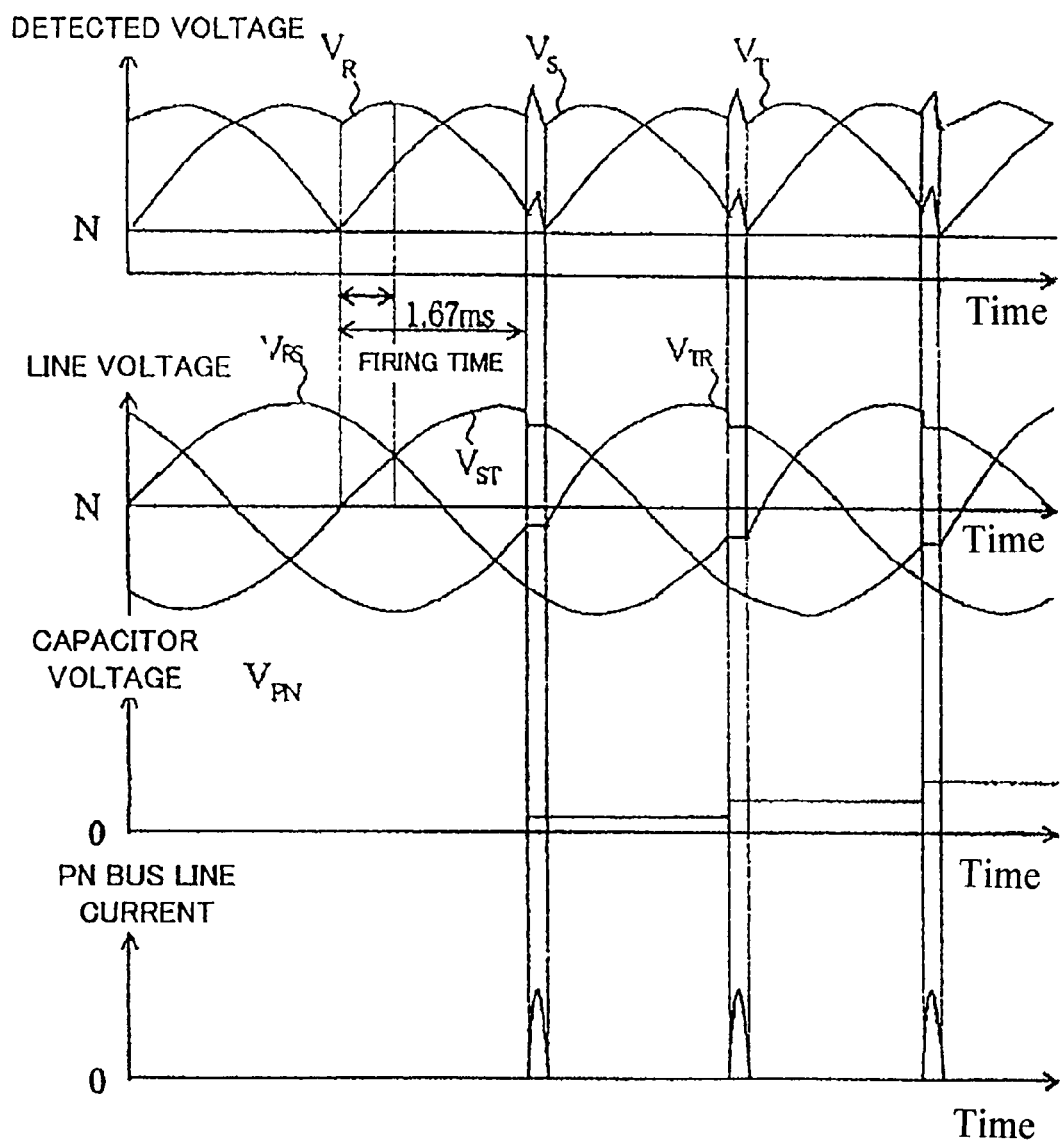

FIG. 3 shows the detected voltage waveforms, the lien voltage waveforms, the capacitor voltage and the PN bus line current at the time of firing the thyristor.

Figure 4:
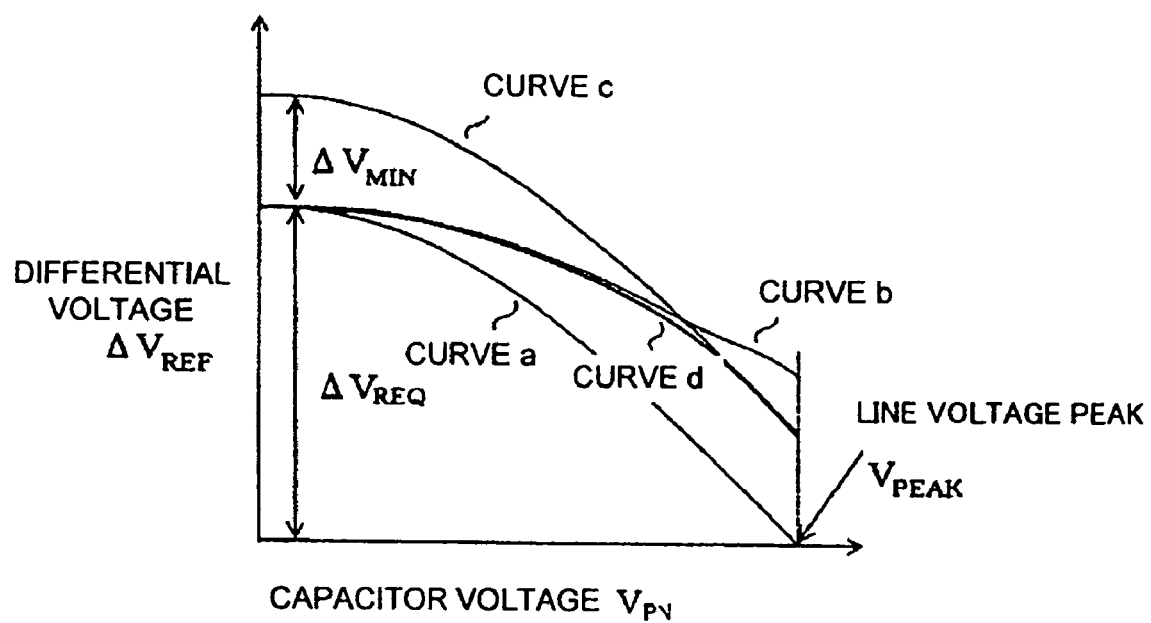
FIG. 4 shows a cosine curve to be used in the present invention.

FIG. 4 shows a cosine curve to be used to control the capacitor charging voltage according to the present invention. In this figure, VPN denotes the capacitor voltage, $\Delta V_{REF}$ denotes a differential voltage between the power supply voltage and the capacitor voltage, $\Delta V_{REQ}$ denotes a capacitor charging adjustment coefficient, $\Delta V_{MIN}$ denotes a differential voltage which is needed and sufficient to charge the capacitor, and $\Delta V_{PEAK}$ denotes a line voltage peak value. The curve a is a curve obtained by multiplying the line voltage waveform by the differential voltage $\Delta V_{REQ}$ necessary to attain the desired capacitor voltage and divided by the peak value $\Delta V_{PEAK}$ of the line voltage waveform, the curve b is a curve obtained by multiplying the curve a by the coefficient in the $V_{PN}$ direction, the curve c is a curve obtained by multiplying the curve a by $\Delta V_{MIN}$ in the $\Delta V_{REF}$ direction, and the curve d is a curve obtained by selecting the lower value of the curve b and the curve c in the $\Delta V_{REF}$ direction and connecting with a curve.

Figure 5:
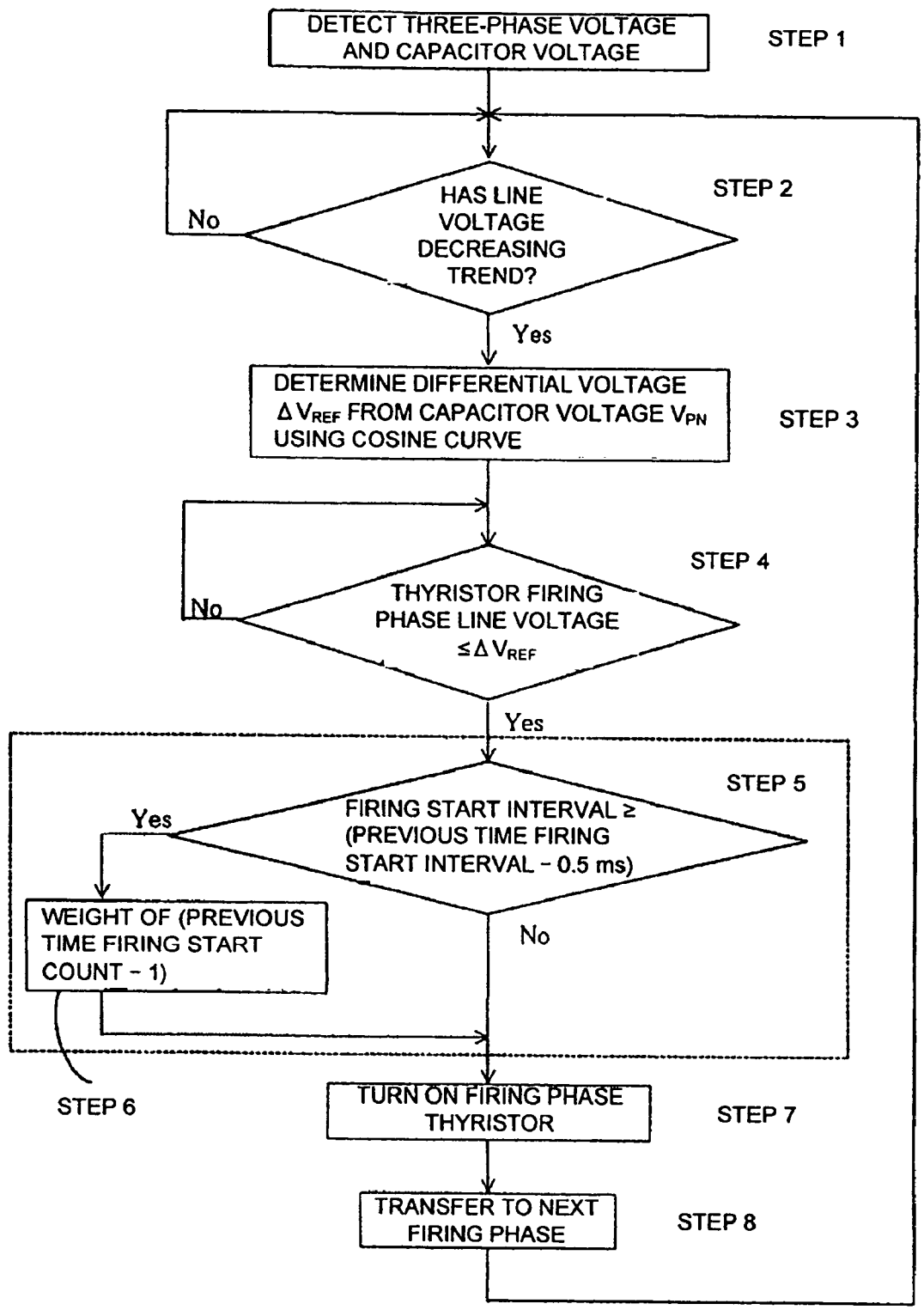
FIG. 5 shows a flowchart showing the processing steps of the method according to the present invention.

FIG. 5 is a flowchart showing the processing steps to be executed by the thyristor converter according to the present invention. The steps of the present invention will be explained in order with reference to this flowchart.

Figure 6:
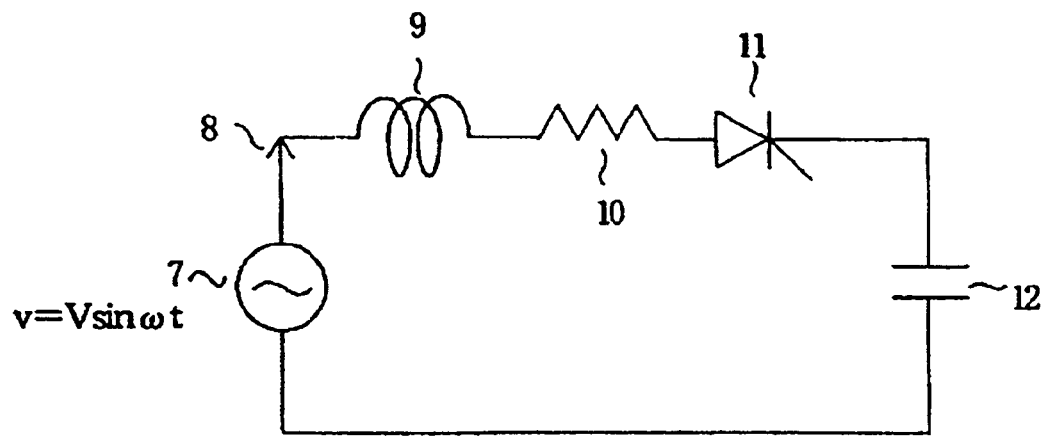
FIG. 6 shows a circuit diagram of a thyristor converter to which the method of the present invention is applied.

FIG. 6 shows a circuit diagram of the thyristor converter to which the method of the present invention is applied. In this figure, the reference numeral "7" denotes a power supply, the reference numeral "8" denotes an inrush current i, the reference numeral "9" denotes a reactance L, the reference numeral "10" denotes a resistor R, the reference numeral "11" denotes a thyristor $T_H$, and the reference numeral "12" denotes a capacitor C.

In FIG. 1, initially, the voltage of the commercial power supply 1 and that of the capacitor 2 are detected by the voltage detection circuit 4. The three-phase AC power supply voltage converted by the A/D converter of the CPU 5 and the capacitor voltage are defined as $V_R$, $V_S$, $V_T$, and $V_{PN}$, respectively. From the detected voltage $V_R$, $V_S$ and $V_T$, the line voltage $V_{RS}$, $V_{ST}$ and $V_{TR}$ will be obtained as follows (Step 1).

When $V_{RS}$, $V_{ST}$ and $V_{TR}$ are defined as $$V_{RS}=V_R-V_S,$$

$$V_{ST}=V_S-V_T, \text{ and}$$

$$V_{TR}=V_T-V_R,$$

the line voltage waveform can be obtained from the three-phase detected voltage waveform as shown in FIG. 2. When this line voltage is used in the control calculation, the N side voltage fluctuations and/or noises can be offset as compared with the case in which the three-phase detected voltage is used as it is, which enables to obtain an accurate power supply voltage. Next, the thyristor should be fired when the line voltage has a decreasing trend. Accordingly, time watching of 1.67 ms in the case of 50 Hz AC power source, and 1.39 ms in the case of a 60 Hz AC power source is performed on the basis when the polarity of the line voltage of the previous thyristor firing phase has changed (Step 2). After the passing of this time, the differential voltage $\Delta V_{REF}$ is determined from the capacitor voltage VPN using a cosine curve (Step 3).

Now, the deriving method of the cosine curve will be explained with reference to FIG. 4. The current circuit of the system for executing the present invention is shown in FIG. 6. The circuit equation can be represented as follows:

$$L \cdot di/dt + R \cdot i + 1/C \cdot \int i \cdot dt = v \qquad (1)$$

In the above equation (1), in order to attain a predetermined capacitor voltage, it is required to adjust $\int i \cdot dt$. The controllable factor is only the difference voltage $\Delta VREF$ between the power supply voltage and the capacitor voltage, that is, the switching control of the thyristor TH. If this ΔVREF is fixed at a constant value, since the inclination of the line voltage becomes smaller as the voltage increases, $\int i \cdot dt$ increases reversely. Accordingly, a curve in which ΔVREF decreases as the line voltage (capacitor voltage VPN) increases as shown in FIG. 4 is required. In FIG. 4, the curve "a" is a curve obtained by multiplying the line voltage waveform by the differential voltage ΔVREQ necessary to obtain a predetermined capacitor voltage and divided by the peak value VPEAK of the line voltage waveform. The curve "b" is a curve obtained by multiplying the curve a as a basic curve by the coefficient in the capacitor voltage direction. This curve b is used to compensate the control calculation delay by the CPU 5. As the line voltage increases, dv/dt decreases and the current increases excessively as mentioned above. Therefore, the current is limited by the curve c of the voltage ΔVMIN which is necessary and sufficient to charge the capacitor 2. The curve "d" obtained by connecting the curve b with the curve c becomes the targeted cosine curve.

Returning to FIG. 2, when the thyristor firing phase line voltage has reached $\Delta V_{REF}$ or less determined using the cosine curve (thyristor firing phase line voltage≤$V_{REF}$) (Step 4), the firing of the thyristor is started (Step 7). Then, the routine proceeds to the watching of the next firing phase line voltage (Step 8). This cycle is repeated until the capacitor voltage has reached the line voltage peak.

As will be understood from the above, by arbitrarily determining $\Delta V_{REQ}$, the differential voltage $\Delta V_{REF}$ can be obtained using the cosine curve, which enables adjustment of the amount of current for raising the capacitor voltage. Furthermore, by providing a ROM in which the cosine curve (curve b) is stored as table data, the loading factor of the CPU 5 can be decreased.

The contents of Example 2 is shown within the dashed line in FIG. 5. As shown in FIG. 3, as the inrush current "I" increases during the thyristor firing, L·di/dt increases, causing a voltage drop, which in turn causes generation of the distortion of the line voltage waveform. Furthermore, in cases where noise is superimposed over the detected voltage waveform, normal sine-wave waveform cannot be obtained. In this case, when comparing the differential voltage $\Delta V_{REF}$ obtained from the cosine curve with the line voltage, it may be judged that the line voltage is lower than the $\Delta V_{REF}$ at an earlier stage due to the distortion of the line voltage waveform, causing the firing of the thyristor, which in turn may cause excess current. Accordingly, the previous thyristor firing timing is stored, and if the calculated thyristor firing timing is earlier than the previously stored thyristor firing timing (earlier than the previous timing by 0.5 ms in this Example) (Yes as Step 5), the firing of the thyristor is started at the time earlier than the previous firing initiation time by one control cycle (Step 6) at Step 7.

In cases where it is judged that the firing of the thyristor starts at an erroneous timing due to noise, etc., by using the previous correct firing information, the capacitor voltage can be increased gradually without interrupting the capacitor charging, which in turn can avoid the suspension of the system using a converter.

The present invention can be applied to an inverter using a converter since a set value can be determined in accordance with an AC power supply or a converter system, and therefore an inrush current can be restrained and a capacitor charging time can be adjusted.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

In this disclosure and during the prosecution of this application, the terminology "present invention" or "invention" may be used as a reference to one or more aspect within the present disclosure. The terms "present invention" or "invention" should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

We claim:

1. A charge control method of a capacitor in a thyristor converter equipped with a thyristor for rectifying an AC voltage, a CPU for outputting an on/off control signal to a thyristor driver for driving the thyristor, a voltage detection sensor for measuring the AC voltage and a capacitor charging voltage, and a capacitor connected to a DC circuit, said method comprising the steps of:

measuring the AC voltage and the capacitor charging voltage with the voltage detection sensor, and determining a differential voltage between the thyristor firing phase voltage and the capacitor charging voltage, and firing the thyristor only when the firing phase voltage of the thyristor becomes lower than a specified voltage determined from the differential voltage, wherein, if a firing start interval of the thyristor is not shorter than a time calculated by subtracting a predetermined time from the previous firing start interval, the thyristor is fired at one control cycle earlier than the previous firing start timing by subtracting 1 from the previous firing start counter value.

2. A charge control method of a capacitor in a thyristor converter equipped with a thyristor for rectifying an AC voltage, a CPU for outputting an on/off control signal to a thyristor driver for driving the thyristor, a voltage detection sensor for measuring the AC voltage and a capacitor charging voltage, and a capacitor connected to a DC circuit, said method comprising the steps of:

measuring the AC voltage and the capacitor charging voltage with the voltage detection sensor, and determining a differential voltage between the thyristor firing phase voltage and the capacitor charging voltage, and firing the thyristor only when the firing phase voltage of the thyristor becomes lower than a specified voltage determined from the differential voltage, wherein a curve a of a capacitor voltage $V_{PN}$ versus a differential voltage $\Delta V_{PN}$ in which the line voltage waveform is multiplied by the differential voltage $\Delta V_{REQ}$ required to attain a predetermined capacitor voltage and divided by a peak value $V_{PEAK}$ of the line voltage waveform is obtained, wherein a curve b in which the curve a is multiplied by a coefficient in the capacitor direction $V_{PN}$ to compensate a control calculation delay by the CPU is obtained, wherein a curve c in which a voltage $\Delta V_{MIN}$ which is necessary and sufficient to charge the capacitor is added to the curve a is obtained, and wherein a curve d in which the curve b is used at an area where the capacitor charging voltage $V_{PN}$ is low and the curve c is used at an area where the capacitor charging voltage is high is obtained.

3. The charge control method of a capacitor in a thyristor converter as recited in claim 2, wherein a ROM in which the curve d as table data is stored is provided.

* * * * *